Aug. 13, 1940.  L. G. WILDER  2,211,451
GROUNDING CLAMP
Filed May 5, 1939
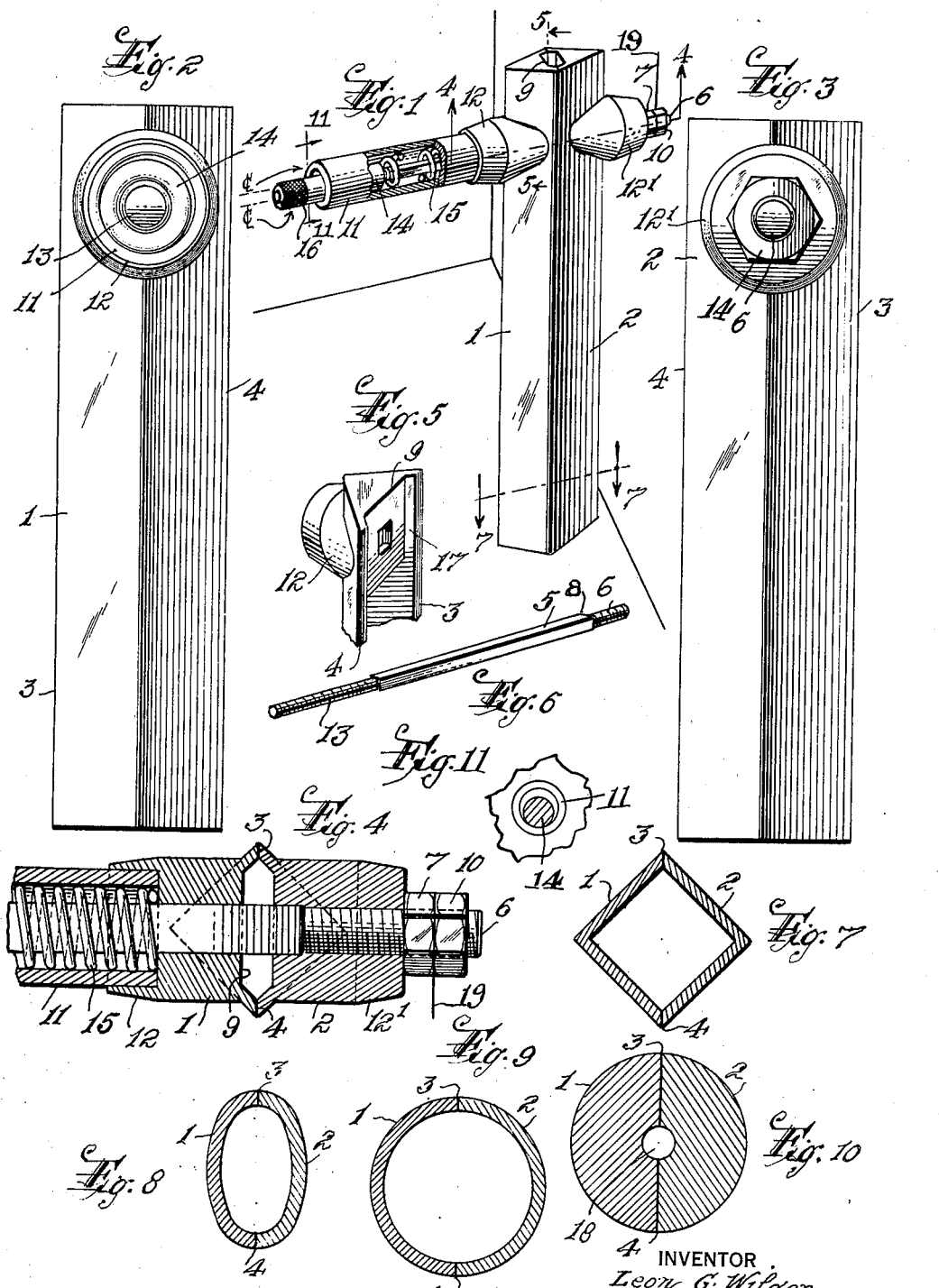
INVENTOR
Leon G. Wilder
BY A. D. T. Libby
ATTORNEY Patented Aug. 13, 1940

2,211,451

UNITED STATES PATENT OFFICE 2,211,451

GROUNDING CLAMP

Leon G. Wilder, Elmira, N. Y.

Application May 5, 1939, Serial No. 271,850

5 Claims. (Cl. 173—273)

This invention relates to a grounding clamp which is especially useful in connection with arc welding, although not limited to this particular use.

In arc welding, in many cases, it is necessary to carry a pair of leads from the welding machine to the work on which the welding operation is to be performed. By way of example, but not of limitation, in welding an automotive vehicle frame one of the wires from the welding machine is attached to the welding handle carrying the welding rod, while the other must be attached to some part of the frame of the vehicle, and to expedite this particular kind of work I have developed the clamp to be hereinafter illustrated and described.

It is therefore the principal object of my invention to provide a grounding clamp which is so constructed that it may be quickly applied to some exposed part of the work-piece or structure, the device being adaptable to various forms and shapes.

Another object of my invention is to provide a grounding clamp which has a high current-carrying capacity with extremely small electrical losses therein. At the same time, it is an object of my invention to provide a grounding clamp which is very sturdy and rigid in its construction, and one which will stand a tremendous amount of abuse in service.

These and other objects will be apparent to one skilled in this art from a study of the specification taken in connection with the annexed drawing, wherein:

Figure 1 is a perspective view of the assembled form of my device, one portion being broken away to show the interior construction.

Figure 2 is an elevational view of Figure 1 looking from left to right, the view being substantially full-size of a device which I have found to be very practical in use.

Figure 3 is a view similar to Figure 2, but of the opposite side of the device shown in Figure 1.

Figure 4 is a view on the line 4—4 of Figure 1.

Figure 5 is a perspective view of the upper end of one of the clamping members, about on the line 5—5 of Figure 1.

Figure 6 is a perspective view of the clamping rod used for holding the clamping or gripping members together.

Figure 7 is a view on the line 7—7 of Figure 1.

Figure 8 is a view similar to Figure 7, but showing a modified form of construction of the gripping members.

Figure 9 is a view similar to Figure 7, but showing a still further modified form of gripping member.

Figure 10 shows a further modified construction.

Figure 11 is a view on the line 11—11 of Figure 1.

The clamp is made up of two elongated members 1 and 2 which, in the form shown in Figures 1 and 7, have the greater portion of their length L-shaped, with gripping surfaces 3 and 4 where the two pieces meet when there is no object between them. The upper end of the grip or member 2 has fastened thereto a stud 5. One end of the stud 5 is threaded at 6 and may be screwed into the grip 2 and then fastened in place by a lock washer, if desirable, and a nut 7 which will draw the shoulder 8 of the stud against an inner face 9. However, as shown in Figure 4, the face 9 is recessed to receive a polygonally shaped rod 5 therein to prevent it from turning in the grip 2 and its collar 12'.

An electrical conductor 19 is adapted to be fastened to the threaded end 6 of the stud 5, as by a nut 10. The rod 5 extends through the upper end of the grip 1 and also through a tubular member 11 which may be of any suitable material, steel being preferable. The member 11 is fastened in any satisfactory manner to a collar portion 12 which extends outwardly from the grip 1. The outer or free end of the stud 5 is threaded at 13 to receive an elongated nut 14 which may be threaded only for a part of its length to engage the threaded portion 13 on the stud 5. Positioned around the rod 5 within the tube 11 is a spring 15 which is adapted to be engaged by the inner end of the nut 14, whereby tension is applied to the spring 15 so as to compress the same and force the gripping member 1 into clamping engagement with any object to which the device is applied.

The application of the device will be obvious from the preceding description. To apply the clamp to any piece of work, for example to an automobile, the grip 1 is pulled away from the grip 2 against the tension of the spring 15 so as to allow the grips 1 and 2 to be passed over some part of the work-piece; for example, on an automobile it may be passed downwardly over the bumper, contact being made along the length of the grips 1 and 2 on the surfaces 3 and 4, it being understood that the grips 1 and 2 are made out of satisfactory material, such as a suitable grade of bronze.

It will be noted that the grips 1 and 2 are made exactly alike so that only one mold is required for making the device. It will also be noted that the outer end of the nut 14 is knurled at 16 to assist in screwing the nut off and on the threaded potion of the stud 5. Also, as shown in Figure 1 and 11, the axial center line of the stud 5 is off the axial center of the tubular member 11, so that when the nut 14 is in place on the stud, it engages a portion of the surface of the tube 11. The idea of this construction is that the upward pressure on the nut 14, due to its engagement with the lower part of the wall of the tube 11, is such as to tend to tilt the threaded end of the stud 5 upwardly, which will draw the lower end of the grip 2 toward the grip 1, the idea being to overcome any tendency of the lower end of the grip members 1 and 2 from undue spreading.

While this particular detail construction is not actually necessary, it has some advantage. However, it will be understood that the stud 5, which is polygonal in shape, a square form being indicated, preferably has a close fit with the member 1. It will also be noted that the upper ends of the grips 1 and 2, wherein the stud 5 is positioned, are solid with the exception of a hole through which the stud passes, and a small area 17 adjacent the upper part of the gripping surfaces 3 and 4.

Instead of making the grips 1 and 2 below the reenforced surfaces 9 in the form shown in Figure 7, they may be made oval in shape, as shown in Figure 8, or circular as shown in Figure 9; and in some cases, they may be substantially solid, with the exception of a central hole 18, as shown in Figure 10.

In arc welding, the size of the ground wire is usually not smaller than a #1 cable, and the hole 18 is made somewhat smaller than this so that the wire may be inserted longitudinally in the hole instead of cross-wise, as in the construction shown in Figures 7, 8 and 9. By adjusting the nut 14 and pulling the grips 1 and 2 apart, the clamp will automatically grip pieces of various thicknesses and shapes, the particular clamp from which the drawings of this application were made, being capable of adjustment to take in pieces up to approximately three inches in thickness.

While I have shown an elongated nut 14, a shorter nut and a cooperating collar may be used in its place, and certain of the other details may be varied to some extent, without departing from the spirit of my invention or the scope of the appended claims.

What I claim is:

1. A grounding clamp comprising, a pair of elongated metallic grips having diametrically and oppositely disposed gripping surfaces along substantially their full length, a tubular member laterally and rigidly carried by one of said grips at one end thereof, a single stud threaded at both ends carried by the other of said grips at one end and extending through it, as well as through the end of the grip carrying the tubular member and through at least the greater part of the length of the tubular member, a spring disposed within the tubular member and a nut on the end of the stud going into the tubular member, and having a part at least adapted to enter the tubular member to compress said spring, as and for the purpose described, and means on the other threaded end of the stud for attaching an electrical conductor to the stud.

2. A grounding clamp comprising, a pair of elongated metallic grips having diametrically and oppositely disposed gripping surfaces along substantially their full length, a tubular member laterally and rigidly carried by one of said grips at one end thereof, a single stud threaded at both ends carried by the other of said grips at one end and extending through it, as well as through the end of the grip carrying the tubular member and through the tubular member, a spring disposed within the member around the stud and a nut on the tubular end of the stud going into the tubular member and having a part at least adapted to enter the tubular member to compress said spring, the stud being positioned within the tubular member with its axis off the axial center of said tubular member forcing the said nut on the stud into engagement with a part of the wall of the tubular member for the purpose described.

3. A grounding clamp including a pair of metallic grips having gripping surfaces for the greater part of their length, a tubular member fastened to one grip and extending laterally therefrom, a stud fastened to the other grip and having means for connecting an electrical conductor thereto, the stud extending through at least the greater portion of the length of the tubular member of the first-mentioned grip, the free end of the stud being threaded, a spring within the tubular member and a nut on the threaded end of the stud adapted to apply tension to the spring for the purpose described, the grips being separable by lateral displacement, one from the other, throughout their entire length, the grips and stud being provided with cooperative means for holding the grips in non-turnable position.

4. A grounding clamp including a pair of elongated metal pieces having diametrically disposed gripping surfaces along the greater part of their length, a tube fastened at the end of one piece and extending laterally away from it, a spring within the tube, a stud fastened to an end of the other piece and provided with means for attaching an electrical conductor thereto, the stud extending through the tube end of the other piece and through the spring and tube, this free end of the stud being threaded and an elongated nut on this threaded end of the stud adapted to extend within the tube to compress said spring for the purpose described.

5. A grounding clamp as set forth in claim 4, further characterized in that the stud is positioned within the tube with its axis off the axial center of said tubular member forcing the nut end entering the tube into engagement with a portion of the inner surface of the tube for the purpose described.

LEON G. WILDER.

CERTIFICATE OF CORRECTION.

Patent No. 2,211,451.  August 13, 1940.

LEON G. WILDER.

It is hereby certified that error appears in the printed specification of the above numbered patent requiring correction as follows: Page 2, second column, line 19, claim 2, strike out the word "tubular" first occurrence, and insert the same before "member" in line 18, same claim; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.